(12) United States Patent
Kurosawa

(10) Patent No.: US 7,680,409 B2
(45) Date of Patent: Mar. 16, 2010

(54) CAMERA SYSTEM AND INTERCHANGEABLE LENS

(75) Inventor: Yuichi Kurosawa, Tokyo (JP)

(73) Assignee: HOYA Corporation, Tokyo (JP)

( * ) Notice: Subject to any disclaimer, the term of this patent is extended or adjusted under 35 U.S.C. 154(b) by 231 days.

(21) Appl. No.: 11/972,692

(22) Filed: Jan. 11, 2008

(65) Prior Publication Data
US 2008/0170845 A1 Jul. 17, 2008

(30) Foreign Application Priority Data
Jan. 15, 2007 (JP) .............................. 2007-005355

(51) Int. Cl.
G03B 13/10 (2006.01)
G03B 13/34 (2006.01)
G03B 13/00 (2006.01)
G03B 13/30 (2006.01)
F16D 13/04 (2006.01)

(52) U.S. Cl. ....................... 396/133; 396/144; 359/822; 192/45

(58) Field of Classification Search .................. 396/133
See application file for complete search history.

(56) References Cited

U.S. PATENT DOCUMENTS 5,701,208 A * 12/1997 Sato et al. .................. 359/822

7,590,339 B2 * 9/2009 Kurosawa .................... 396/76
2003/0034218 A1 * 2/2003 Hu et al. ....................... 192/45

FOREIGN PATENT DOCUMENTS

| JP | 2006-145783 | 6/2006 |
|---|---|---|
| JP | 2006-259113 | 9/2006 |

OTHER PUBLICATIONS

English language Abstract of JP 2006-145783.
English language Abstract of JP 2006-259113.

* cited by examiner

*Primary Examiner*—Melissa J Koval
(74) *Attorney, Agent, or Firm*—Greenblum & Bernstein PC

(57) ABSTRACT

A camera system includes a camera body having an in-body motor; an interchangeable lens having an in-lens motor, the interchangeable lens being detachable from the camera body; a focusing mechanism for moving a focusing lens group provided in the interchangeable lens in an optical axis direction thereof; a rotational force transmission device which transmits a rotational force of the in-body motor to the focusing mechanism to perform an AF operation in a state where the interchangeable lens is attached to the camera body; an auto-focusing mechanism for driving the focusing mechanism to perform an AF operation by the in-lens motor, independently from the in-body motor; and a one-way clutch which allows transmission of a rotational force of the in-body motor to the in-lens motor while preventing a rotational force of the in-lens motor from being transmitted to the in-body motor.

12 Claims, 7 Drawing Sheets

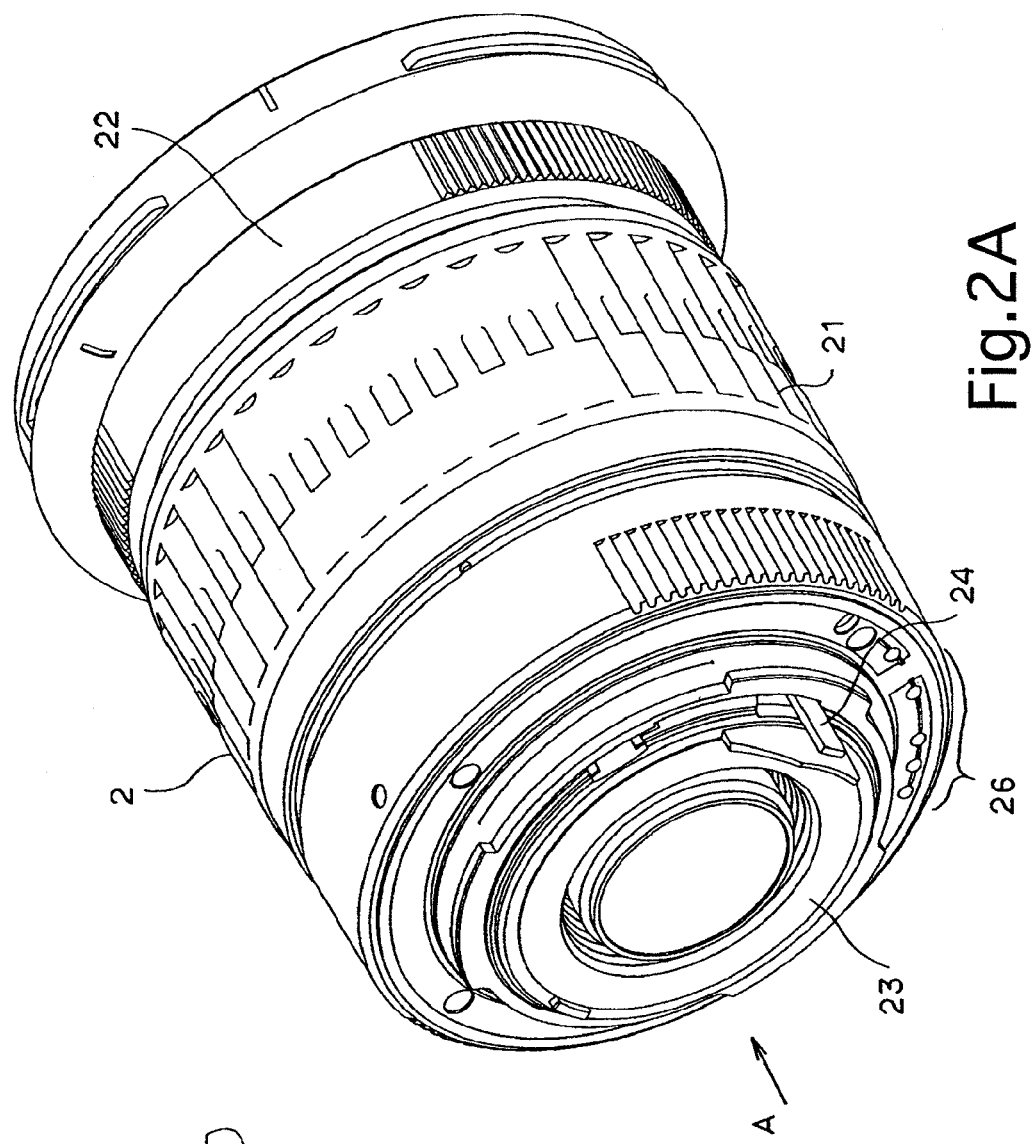
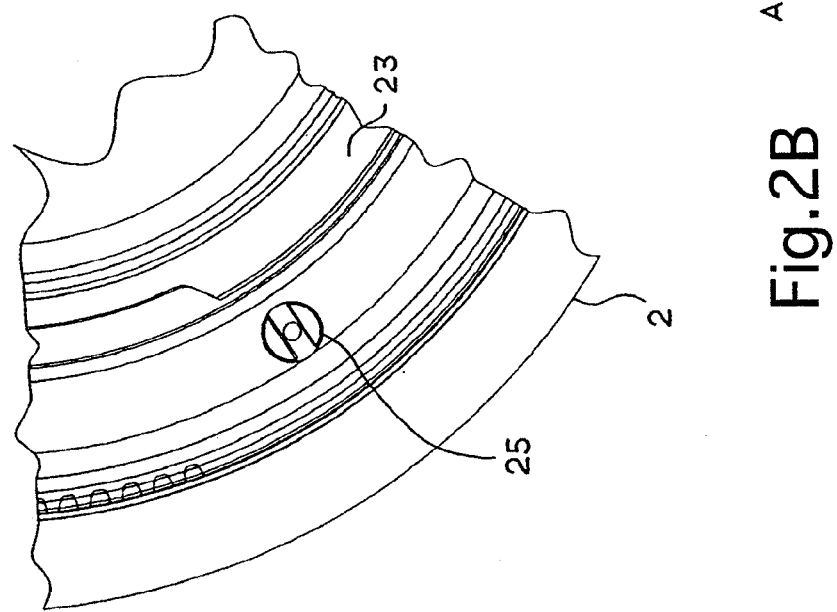
Fig.2A
Fig.2B

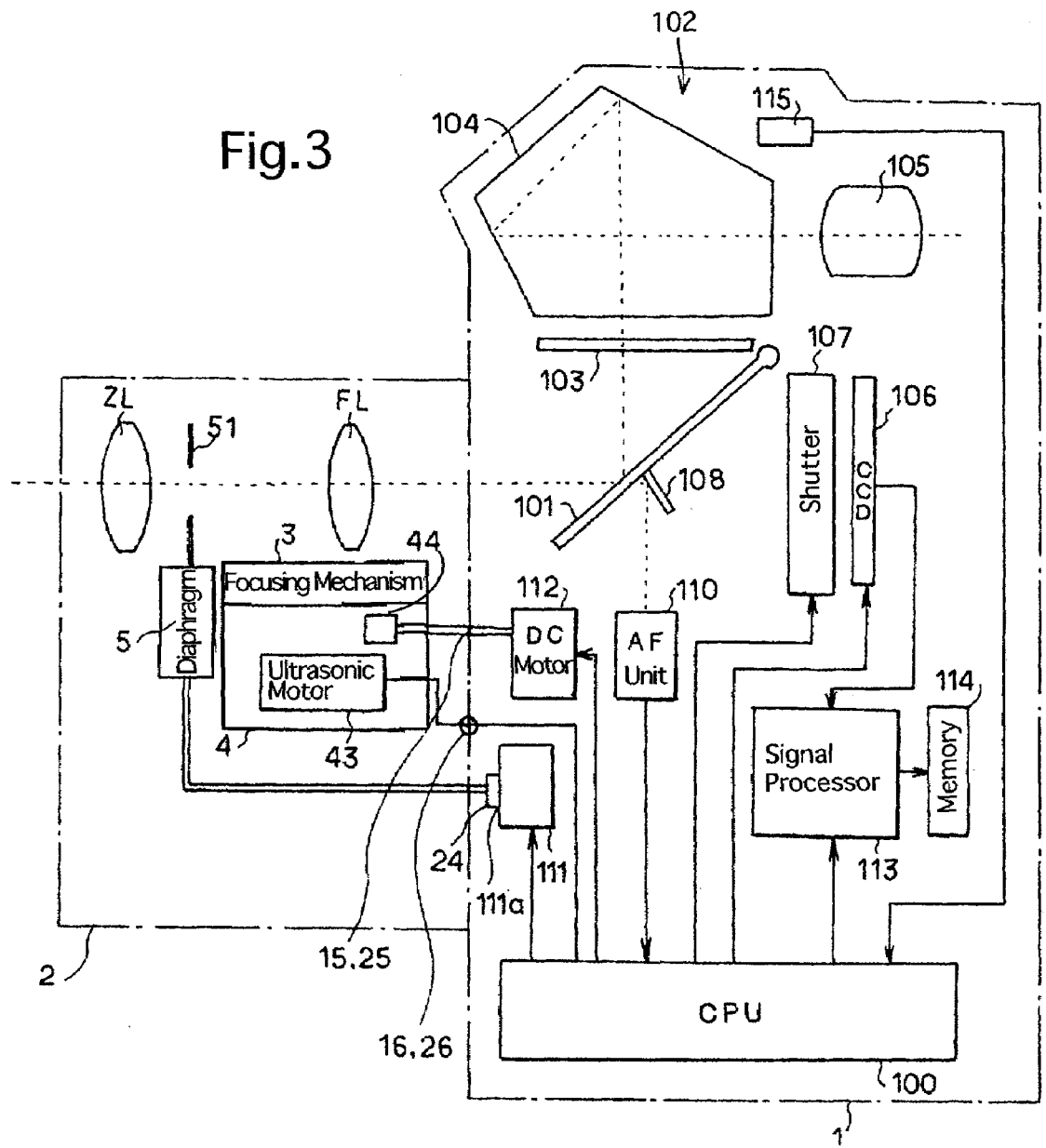

CAMERA SYSTEM AND INTERCHANGEABLE LENS

BACKGROUND OF THE INVENTION

1. Field of the Invention

The present invention relates to a camera system using an interchangeable photographic lens, and in particular relates to a camera system adopting a dual motor control system for controlling an autofocus (AF) operation using a motor contained in the interchangeable photographic lens and a motor contained in the camera body. The present invention further relates an interchangeable lens of such a camera system.

2. Description of the Related Art

In conventional camera systems using an interchangeable photographic lens, an AF operation of the interchangeable lens is performed by a motor contained in the camera body (hereinafter referred to as an in-body motor) to which the interchangeable lens is mounted. However, in recent years, a camera system using an interchangeable lens wherein the interchangeable lens incorporates it's own motor (hereinafter referred to as an in-lens motor) and is configured to be capable of performing an AF operation using the in-lens motor, has been proposed.

For instance, technology for improving the operability of a digital camera system wherein a type of interchangeable lens which is driven by an in-lens motor and another type of interchangeable lens which is driven by an in-body motor are selectively mountable to the camera body has been proposed in Japanese unexamined patent publication 2006-259113. If the camera body is configured to be capable of performing an AF operation for each of various types of interchangeable lenses only with the in-body motor, the load on the in-body motor varies due to the difference between the specifications of the various types of interchangeable lenses, which sometimes causes difficulty in performing control of each interchangeable lens properly. However, providing each interchangeable lens with an in-lens motor in such a manner disclosed in the aforementioned Japanese unexamined patent publication to perform an AF operation makes it possible to achieve proper control of each interchangeable lens. Such a type of interchangeable lens that is provided therein with an in-lens motor is referred to as a dual-motor-compatible interchangeable lens in the present specification. In the camera system equipped with the dual-motor-compatible interchangeable lens, the camera body is configured to select, from among the in-lens motor and the in-body motor, the in-lens motor as the motor having priority use for an AF operation, upon the dual-motor-compatible interchangeable lens being mounted to the camera body.

In the dual-motor-compatible interchangeable lens, an ultrasonic motor that is small, lightweight and operates with a low noise level is adopted as the in-lens motor. This ultrasonic motor is composed of a stator having a plurality of circumferentially arranged piezoelectric elements that are polarized in the circumferential direction, and a rotor in the form of an annular plate or a circular plate, which is in press contact with the stator at a predetermined pressure. Applying a high-frequency voltage to the piezoelectric elements of the stator causes the piezoelectric elements to vibrate, and this vibration is amplified in the circumferential direction by comb teeth integral with the piezoelectric elements to thereby cause a progressive-wave motion of the comb teeth in the circumferential direction. As a result, the rotor which is in frictional contact with the piezoelectric elements rotates about the rotation axis of the rotor. In this ultrasonic motor, a predetermined contact pressure is continuously exerted on the abutment surfaces of the rotor and the stator by a resilient member to enhance the rotation efficiency of the ultrasonic motor (to enhance the rotational energy of the rotor with respect to the vibration energy of the stator).

Since the rotor is made to remain in press contact with the stator in this manner in the ultrasonic motor, the surfaces of the stator and the rotor which are in press contact with each other stick (adhere) to each other by an interfacial force produced therebetween to thereby cause an increase in static friction therebetween. As a consequence, a large torque may be required to rotate the rotor when the ultrasonic motor is actuated, the rotor may not be able to start rotating smoothly to thereby cause a reduction of the start-up performance of the motor, or the motor may become impossible to rotate in the worst scenario. Accordingly, in the type of dual-motor-compatible interchangeable lens in which an ultrasonic motor is adopted as the in-lens motor, or in the camera body to which this type of dual-motor-compatible interchangeable lens is mounted, if the in-lens motor is driven to perform an AF operation of the interchangeable lens during a photographing operation (image capturing), a delay in start-up of the in-lens motor may cause a delay in the AF operation or make the AF operation impossible to be performed; accordingly, it is sometimes the case that a picture cannot be taken in a correct in-focus state. This sort of problem also occurs in a dual-motor-compatible interchangeable lens that is configured to perform a zoom control operations using the in-lens motor.

SUMMARY OF THE INVENTION

The present invention provides a dual-motor-compatible interchangeable lens having an ultrasonic motor as an in-lens motor, wherein the interchangeable lens is configured to achieve an improvement in start-up performance during an AF operation to thereby allow correct photography even in a camera system in which the dual-motor-compatible interchangeable lens is mounted to a camera body. The present invention further provides such an interchangeable lens.

According to an aspect of the present invention, a camera system is provided, including a camera body having an in-body motor; an interchangeable lens having an in-lens motor, the interchangeable lens being detachable from the camera body; a focusing mechanism for moving a focusing lens group provided in the interchangeable lens in an optical axis direction thereof; a rotational force transmission device which transmits a rotational force of the in-body motor to the focusing mechanism to perform an AF operation in a state where the interchangeable lens is attached to the camera body; an auto-focusing mechanism for driving the focusing mechanism to perform an AF operation by the in-lens motor, independently from the in-body motor; and a one-way clutch which allows transmission of a rotational force of the in-body motor to the in-lens motor while preventing a rotational force of the in-lens motor from being transmitted to the in-body motor.

It is desirable for the in-lens motor to include an ultrasonic motor.

It is desirable for the rotational force transmission device to include a lens-side AF coupler provided on the interchangeable lens, and a body-side AF coupler provided on the camera body. The lens-side AF coupler is coupled with the body-side AF coupler when the interchangeable lens is attached to the camera body, the body-side AF coupler outputting the rotational force of the in-body motor.

It is desirable for the in-lens motor to be constantly engaged with the focusing mechanism, and for the one-way clutch to be provided between the lens-side AF coupler and the focusing mechanism.

It is desirable for the camera system to include a focus ring which is manually operated in a manual focusing operation, wherein the focusing mechanism includes a focus-ring gear ring which moves the focusing lens group in the optical axis direction when rotated. The focus-ring gear ring is engaged with the focus ring to rotate with the focus ring when the focus ring is manually rotated.

It is desirable for the one-way clutch to includes a cam body shaped like fused petals in cross section, and a plurality of cylindrical rollers arranged around the cam body to move thereon.

It is desirable for the focus ring and the focus-ring gear ring to be coaxially arranged.

It is desirable for the in-body motor to include a DC motor, and for the camera body to include a controller which drives the DC motor before driving the in-lens motor upon start-up of the AF operation.

It is desirable for the controller to control the in-lens motor so as to start rotating during operation of the in-body motor, and for the controller to control the in-body motor so as to stop rotating after commencement of rotation of the in-lens motor.

It is desirable for the in-body motor and the in-lens motor to rotate simultaneously for at least 10 ms from a moment at which the in-lens motor starts rotating to a moment at which the in-body motor stops rotating.

It is desirable for a rotational speed of the focusing mechanism that is driven by the in-body motor to be slower than a rotational speed of the focusing mechanism that is driven by the in-lens motor when the in-body motor and the in-lens motor rotate simultaneously.

In an embodiment, an interchangeable lens is provided, which is detachable from a camera body, the camera body having an in-body motor, the interchangeable lens including a focusing mechanism for moving a focusing lens group in an optical axis direction thereof; a rotational force transmission device which transmits a rotational force of the in-body motor to the focusing mechanism to perform an AF operation in a state where the interchangeable lens is attached to the camera body; an in-lens motor; an auto-focusing mechanism for driving the focusing mechanism to perform an AF operation by the in-lens motor, independently from the in-body motor; and a one-way clutch which allows transmission of a rotational force of the in-body motor to the in-lens motor while preventing a rotational force of the in-lens motor from being transmitted to the in-body motor.

According to an aspect of the present invention, when an AF operation is performed with the dual-motor-compatible interchangeable lens being mounted to the camera body that contains an in-body motor, the AF operation can be performed by driving the focusing mechanism by the rotational force (torque) of the in-body motor, or the AF operation can be performed by driving the focusing mechanism by the rotational force of the in-lens motor. Moreover, the one-way clutch prevents the rotational force of the in-lens motor from being transmitted to the in-body motor when an AF operation is performed by rotation of the in-lens motor, thereby preventing a harmful influence on the AF operation which may be caused by interference between rotating operations of the two motors.

According to another aspect of the present invention, if the start-up performance of the in-lens motor is poor upon an AF operation being performed, especially when the in-lens motor cannot start rotating or a delay in start-up of the ultrasonic motor occurs due to the sticking between contact surfaces of the stator and the rotor of the ultrasonic motor, the controller drives the in-body motor before driving the in-lens motor so that such sticking is released by rotating the rotor provided in the in-lens motor forcefully by the rotational force of the in-body motor, which makes it possible to achieve an improvement in start-up performance of the in-lens motor, thus allowing a correct AF operation to be performed quickly, and hence making it possible to take a desired in-focus photograph.

The present disclosure relates to subject matter contained in Japanese Patent Application No. 2007-5355 (filed on Jan. 15, 2007) which is expressly incorporated herein in its entirety.

BRIEF DESCRIPTION OF THE DRAWINGS

The present invention will be discussed below in detail with reference to the accompanying drawings, in which:

FIG. 2A is a rear perspective view of a dual-motor-compatible interchangeable lens of the camera system;

FIG. 2B is an elevational view of a portion of the rear end of the interchangeable lens shown in FIG. 2A, viewed in the direction shown by the arrow A in FIG. 2A;

FIG. 3 is a schematic diagram of the embodiment of the camera system;

DESCRIPTION OF THE PREFERRED EMBODIMENT

Figure 1:
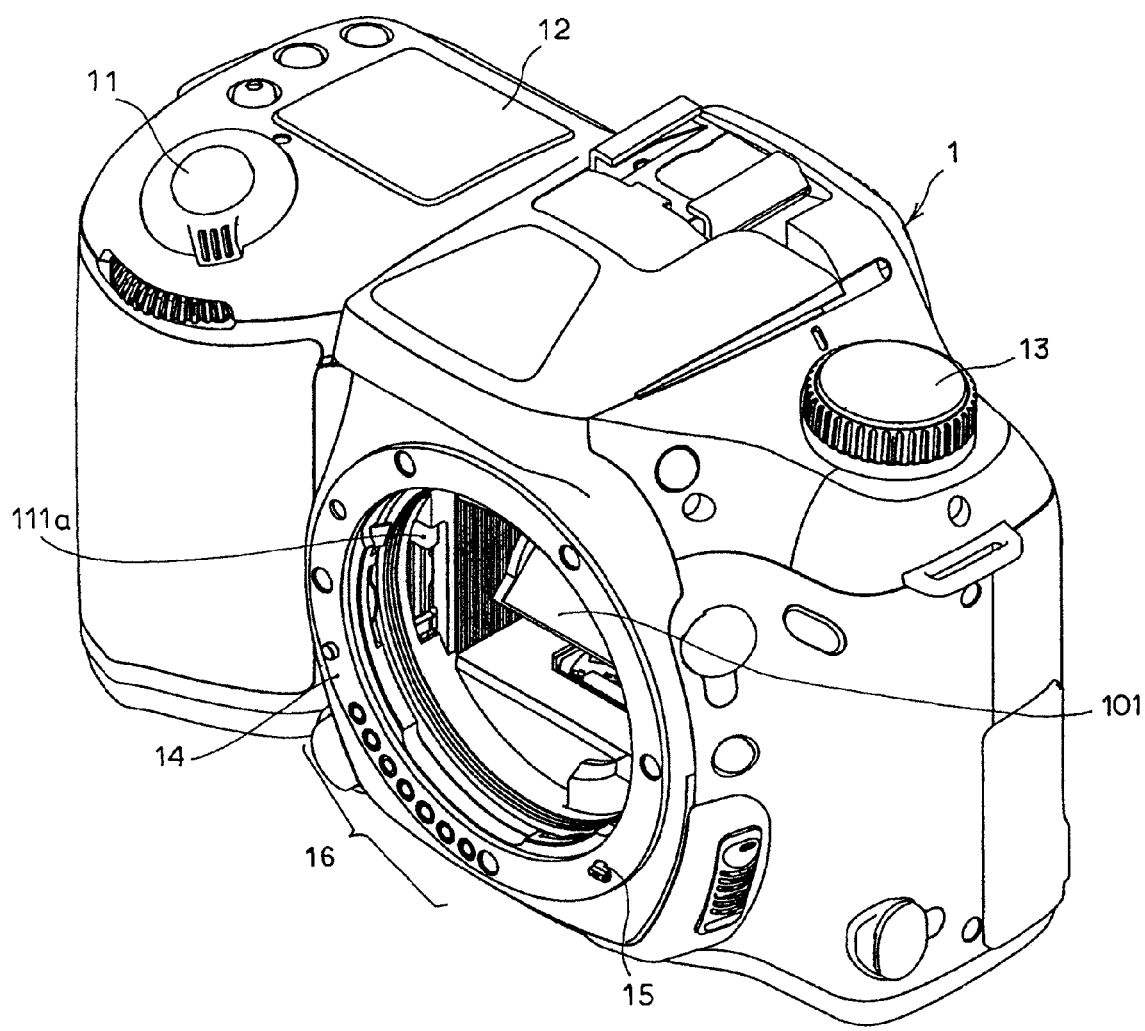
FIG. 1 is a front perspective view of a camera body of an embodiment of a camera system according to the present invention.

FIG. 1 is a front perspective view of a camera body 1 of an embodiment of a camera system which uses a dual-motor-compatible interchangeable lens 2, according to the present invention. FIG. 2A is a rear perspective view of the interchangeable lens 2 of the camera system, and FIG. 2B is an elevational view of a portion of the rear end of the interchangeable lens 2, viewed in the direction shown by the arrow A in FIG. 2A. As shown in FIG. 1, the camera body 1 is provided with a release button 11, an LCD indicator 12 and a mode select dial 13.

The camera body 1 is provided on the front thereof with a lens mount 14 to which the interchangeable lens 2 is detachably attached. The camera body 1 is provided on the lens mount 14 with a body-side AF coupler 15 and an array of information/power supply contact pins 16. The camera body 1 is further provided therein with a main mirror (quick-return mirror) 101 and a diaphragm-driving slide plate 111a that are exposed outwards from the lens mount 14 as shown in FIG. 1. The details of the main mirror 101 and the diaphragm-driving slide plate 111a will be discussed later.

As shown in FIG. 2, the interchangeable lens 2 is provided along the outer periphery thereof with a zoom ring 21 and a focus ring 22, each of which can be manually operated and are coaxially arranged side by side in the axial direction of the interchangeable lens 2. The zoom ring 21 is manually operated when the focus length of the interchangeable lens 2 is manually adjusted, and the focus ring 22 is manually operated when the focus is manually adjusted. The interchangeable lens 2 is provided at the rear end thereof with a bayonet mount portion 23 which is brought into engagement with the lens mount 14 of the camera body 1 to attach the interchangeable lens 2 to the camera body 1. The interchangeable lens 2 is provided, in association with the bayonet mount portion 23, with a diaphragm drive lever 24, a lens-side AF coupler 25 and an array of information/power contact pins 26. The diaphragm drive lever 24 is driven by the diaphragm-driving slide plate 111a of the camera body 1 to drive a diaphragm mechanism 5 (see FIG. 3) provided in the interchangeable lens 2. The lens-side AF coupler 25 is coupled to the aforementioned body-side AF coupler 15 when the interchangeable lens 2 is properly attached to the camera body 1. The array of information/power contact pins 26 are provided to correspond to the array of information/power supply contact pins 16 of the camera body 1.

FIG. 3 is a schematic diagram showing a state where the interchangeable lens 2 is mounted to the camera body 1. Bringing the bayonet mount portion 23 of the interchangeable lens 2 (shown in FIG. 2) into engagement with the lens mount 14 of the camera body 1 (shown in FIG. 1) causes the body-side AF coupler 15 and the lens-side AF coupler 25 to be coupled to each other so that the body-side AF coupler 15 and the lens-side AF coupler 25 can integrally rotate together about a common axis of rotation. In this coupled state, the body-side AF coupler 15 and the lens-side AF coupler 25 constitute a rotational force transmission device for transmitting a rotational force of an in-body motor (DC motor) 112 from the body-side AF coupler 15 to the lens-side AF coupler 25 when the in-body motor 112 is driven. The in-body motor 112 is provided inside the camera body 1. Due to this rotational force transmitted to the lens-side AF coupler 25, the operation of an auto-focusing mechanism 4 provided inside the interchangeable lens 2 can be controlled. Additionally, upon the interchangeable lens 2 being attached to the camera body 1, the array of information/power contact pins 26 of the interchangeable lens 2 come into contact with the array of information/power supply contact pins 16 of the camera body 1, respectively, so that various information can be exchanged between the camera body 1 and the interchangeable lens 2 and power can be supplied from the camera body 1 to the interchangeable lens 2. This information includes AF information which is sent from the camera body 1 to the interchangeable lens 2 and AF-feedback information which is sent from the interchangeable lens 2 to the camera body 1. Additionally, the diaphragm-driving slide plate 111a of the camera body 1 engages with the diaphragm drive lever 24 of the interchangeable lens 2 so that a sliding movement of the diaphragm-driving slide plate 111a causes the diaphragm drive lever 24 to move in association with the sliding movement of the diaphragm-driving slide plate 111a, thus causing the diaphragm mechanism 5 in the interchangeable lens 2 to operate.

In the interchangeable lens 2, manually rotating the zoom ring 21 causes a zooming lens group ZL, which is one of a plurality of lenses provided in the interchangeable lens 2, to move in the optical axis direction of the interchangeable lens 2 (horizontal direction as viewed in FIG. 3) to thereby set a required or desired focal length. In addition, manually rotating the focus ring 22 causes a focusing lens group FL to move in the optical axis direction via a focusing mechanism 3 provided in the interchangeable lens 2 to carry out a focusing operation. The auto-focusing mechanism 4 is provided with a focus-ring gear ring 41 which is coupled to the focus ring 22. Rotating the focus-ring gear ring 41 about the optical axis by manually rotating the focus ring 22 causes the focusing lens group FL to move in the optical axis direction via the focusing mechanism 3 that uses a known cam ring (not shown). The diaphragm mechanism 5 in the interchangeable lens 2 is provided with an iris diaphragm which has a plurality of blades 51 which are driven by movements of the diaphragm drive lever 24 in a circumferential direction of the interchangeable lens 2 to control the aperture diameter of the interchangeable lens 2.

Figure 4:
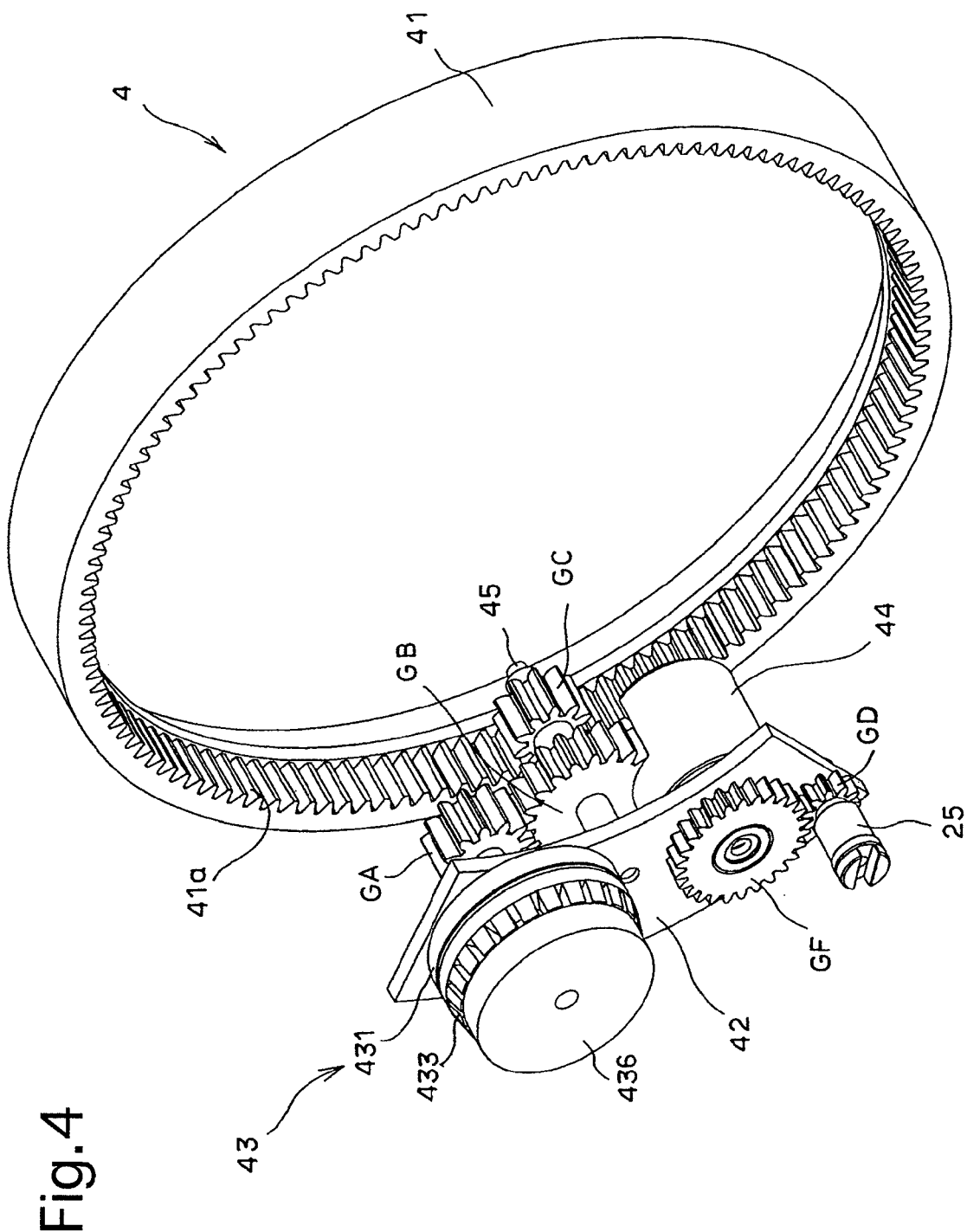
FIG. 4 is a perspective view of an auto-focusing mechanism including a focus-ring gear ring that is provided in the interchangeable lens shown in FIG. 2A.

As shown in FIG. 4, which shows a perspective view of some main components of the auto-focusing mechanism 4, the auto-focusing mechanism 4 is provided with the focus-ring gear ring 41 that is installed inside the interchangeable lens 2 and coupled to the focus ring 22. The focusing lens group FL moves in the optical axis direction to perform a focusing operation when the focus ring 22 is rotated as mentioned above. The focus-ring gear ring 41 is a ring gear provided on an inner peripheral surface thereof with an inner gear 41a which extends entirely in the circumferential direction of the focus-ring gear ring 41. The rotation of each of the focus ring 22 and the focus-ring gear ring 41 is controlled by the operation of an in-lens ultrasonic motor (in-lens motor) 43. As shown in FIG. 4, the auto-focusing mechanism 4 is provided with the in-lens ultrasonic motor 43 and a clutch 44. The in-lens ultrasonic motor 43 is mounted to a base plate 42. The clutch 44 is a so-called "quick-focus clutch" and is configured to serve as a one-way clutch which transmits rotation of the lens-side AF coupler 25 to the focus-ring gear ring 41 when the lens-side AF coupler 25 is rotated by rotation of the in-body motor 112 via the body-side AF coupler 15, and prevents rotation of the focus-ring gear ring 41 from being transmitted to the lens-side AF coupler 25 when the focus-ring gear ring 41 is rotated by manual rotation of the focus ring 22 and prevents rotation of the in-lens ultrasonic motor 43 from being transmitted to the lens-side AF coupler 25 upon the in-lens ultrasonic motor 43 being driven.

Figure 5:
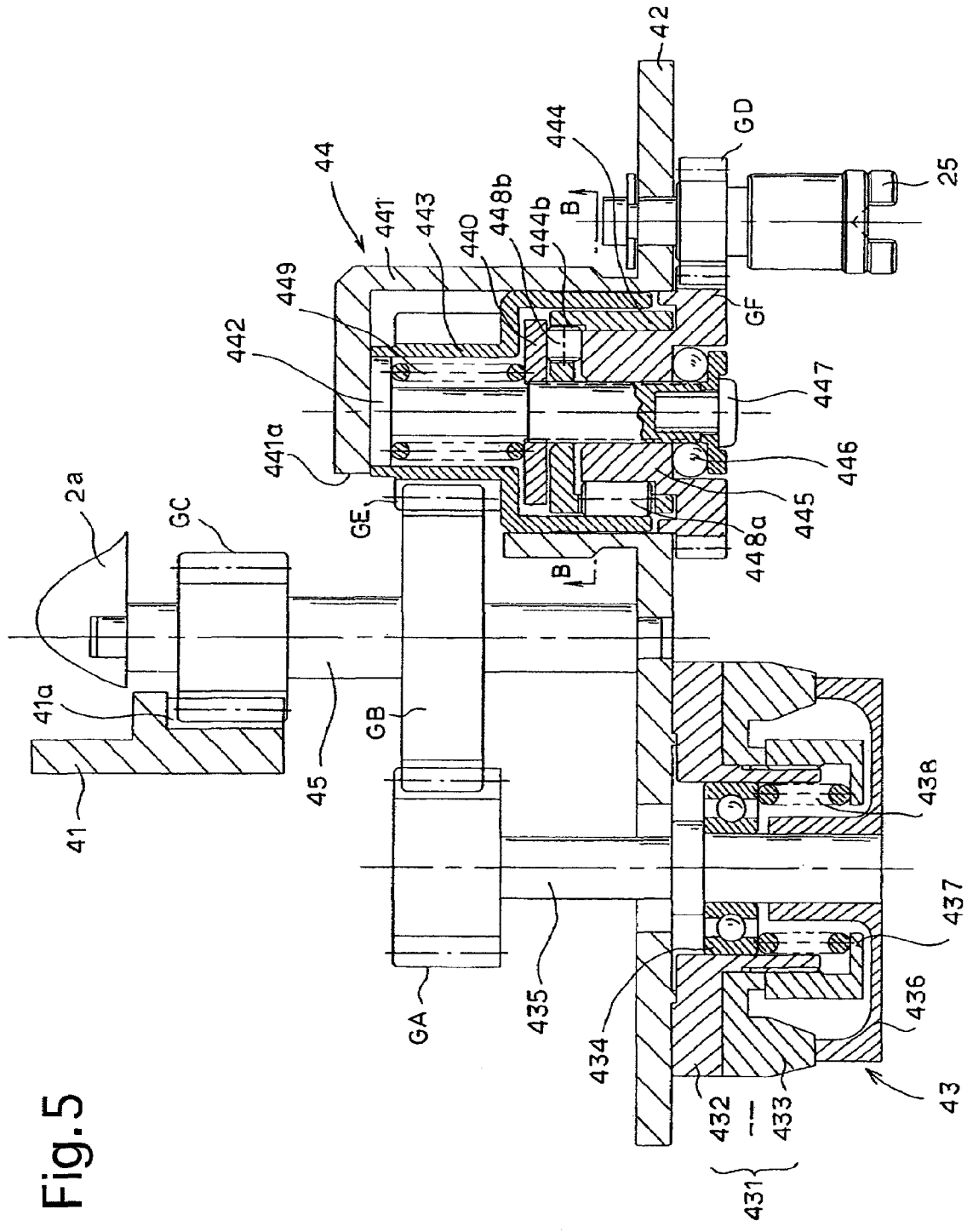
FIG. 5 is an enlarged plan view, partly in cross section, of the auto-focusing mechanism shown in FIG. 4.

FIG. 5 is an enlarged plan view of the main components of the auto-focusing mechanism 4. The in-lens ultrasonic motor 43 is supported by a part of the base plate 42. The in-lens ultrasonic motor 43 is provided, below a disk-shaped base 432 as viewed in FIG. 5, with a comb-tooth body 433 which is in the shape of a shallow cylindrical vessel having a plurality of comb teeth arranged in the circumferential direction. The comb-tooth body 433 is provided integrally on the upper surface thereof with a circular piezoelectric element (not shown) in the form of a circular thin disc, which is polarized in the circumferential direction. This piezoelectric element and the comb-tooth body 433 constitute a stator 431. A high-frequency voltage is applied to the stator 431 (to the piezoelectric element) as a driving signal from the camera body 1. The in-lens ultrasonic motor 43 is provided with a ball bearing 434 installed in the center of the stator 431. The ball bearing 434 supports a motor output shaft 435. The in-lens ultrasonic motor 43 is provided with a rotor 436 having the shape of a shallow cylinder which is fixed to one end of the motor output shaft 435. A circumferential end surface of the rotor (upper end surface as viewed in FIG. 5) 436 comes in contact with the end surfaces (lower end surfaces as viewed in FIG. 5) of the comb teeth of the comb-tooth body 433 in the axial direction of the in-lens ultrasonic motor 43 (vertical direction as viewed in FIG. 5). The in-lens ultrasonic motor 43 is provided with a compression coil spring 438 between a spring retainer 437 and the ball bearing 434 in a compressed state, so that the resilient spring force of the compression coil spring 438 biases the ball bearing 434 upward as viewed in FIG. 5, thus biasing the motor output shaft 435 and the rotor 431 upward as viewed in FIG. 5 to thereby cause the aforementioned circumferential end surface of the rotor 436 to come into press contact with the end surfaces of the comb teeth of the comb-tooth body 433. The in-lens ultrasonic motor 43 is fixed at the disk-shaped base 432 thereof to the base plate 42 to be supported thereby. A gear GA is fixed to the other end of the motor output shaft 435.

Upon a required high-frequency voltage being applied to the stator 431 of the in-lens ultrasonic motor 43, the piezoelectric element that is provided on the comb-tooth body 433 vibrates, so that the comb-tooth body 433 vibrates, which causes displacements of the plurality of comb teeth (arranged in the circumferential direction) of the comb-tooth body 433 in the circumferential direction. Consequently, the plurality of comb teeth of the comb-tooth body 433 operate to generate a progressive wave. Since the circumferential end surface of the rotor 436 comes in press contact with the end surfaces of the comb teeth of the comb-tooth body 433 of the stator 431 by the spring force of the compression coil spring 438, the frictional force produced between the press-contact surfaces of the rotor 436 and the stator 431 by the spring force of the compression coil spring 438 causes the rotor 436 to rotate in the circumferential direction, thus causing the motor output shaft 435, which supports the rotor 436, and the gear GA to rotate.

The auto-focusing mechanism 4 is provided with a rotary drive shaft 45 which extends parallel to the motor output shaft 435. One end of the rotary drive shaft 45 is rotatably supported by a portion of the base plate 42 in the vicinity of the in-lens ultrasonic motor 43 while the other end of the rotary drive shaft 45 is rotatably supported by a stationary portion 2a of the interchangeable lens 2. A gear GB which meshes with the gear GA, and a gear GC which meshes with the inner gear 41a of the focus-ring gear ring 41, are integrally formed on the rotary drive shaft 45 to be capable of rotating with the rotary drive shaft 45. According to this construction, the in-lens ultrasonic motor 43 is constantly engaged with the focus-ring gear ring 41 (and hence, the focusing mechanism 3) via the motor output shaft 435, the gears GA and GB, the rotary drive shaft 45, and the gear GC.

The lens-side AF coupler 25 is supported by another portion of the base plate 42. A gear GD is integrally formed on a portion of the lens-side AF coupler 25 in the axial direction thereof. The auto-focusing mechanism 4 is provided, on the base plate 42 between the lens-side AF coupler 25 and the rotary drive shaft 45, with the aforementioned clutch 44.

Figure 6:
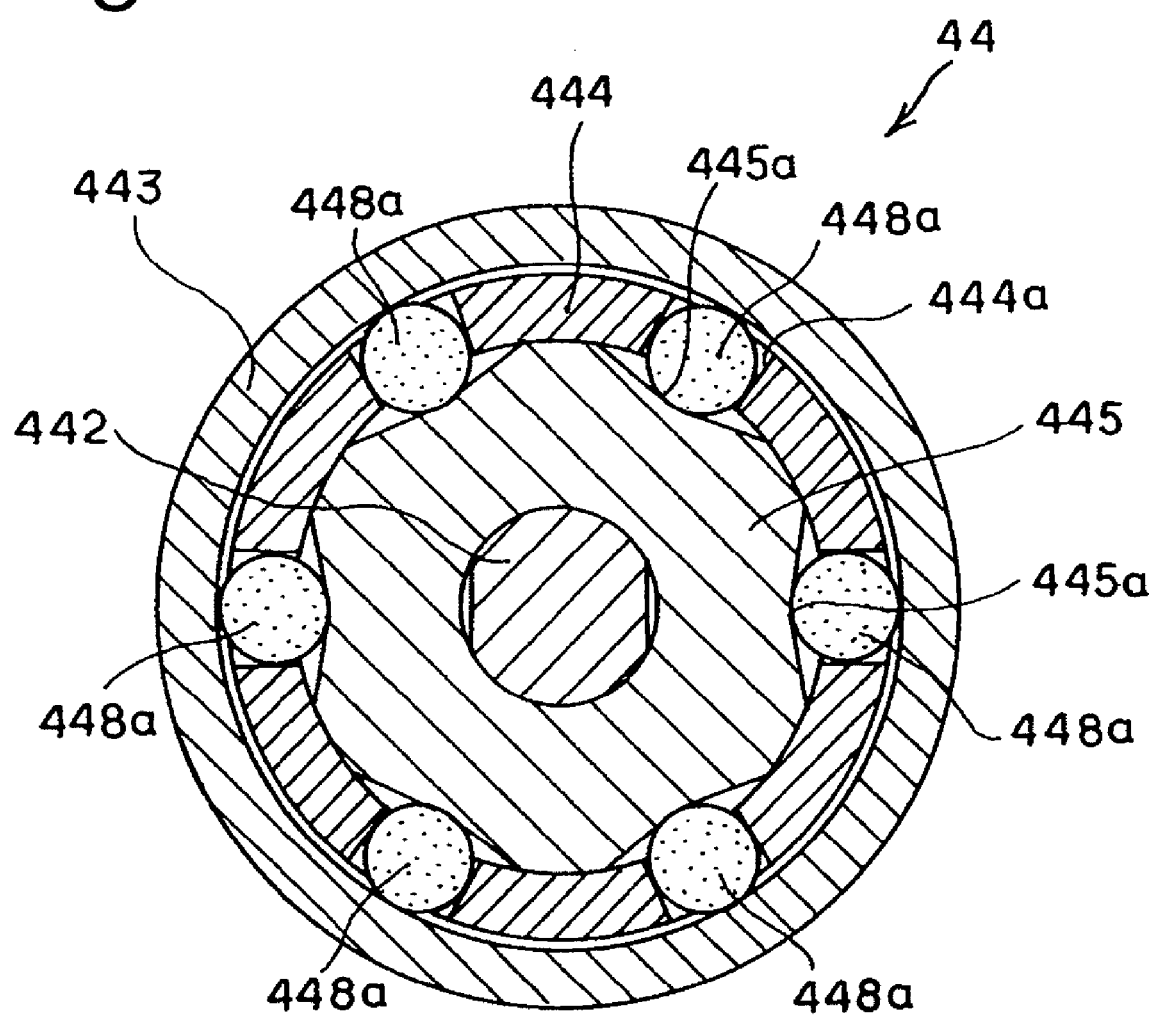
FIG. 6 is a cross sectional view taken along B-B line shown in FIG. 5.

The structure of the clutch 44 is substantially the same as that of the clutch disclosed as a one-way clutch in Japanese unexamined patent publication 2006-145783. The clutch 44 is provided with a housing 441 formed in the shape of a cylindrical case as a part of the base plate 42. The clutch 44 is provided in the housing 441 with a clutch shaft 442 fixed to the housing 441. The clutch 44 is further provided with an output cylinder 443, a cylindrical-shaped retainer 444 and a cam body 445. The output cylinder 443 is positioned concentrically around the clutch shaft 442. The cylindrical-shaped retainer 444 is fitted into the output cylinder 443 to be positioned concentrically around the clutch shaft 442. The cam body 445 is fitted into the retainer 444 to be concentric therewith. The cam body 445 is columnar in shape and has a cross-sectional shape like that of fused petals, taken along a plane orthogonal to the axial direction of the clutch shaft 442. FIG. 6 shows a cross-section taken along B-B line shown in FIG. 5 to show this cross-sectional shape of the cam body 445. An output gear GE is formed integral with the outer periphery of one end (upper end as viewed in FIG. 5) of the output cylinder 443 to mesh with the gear GB through a cutout portion (through hole) 441a formed in a part of the housing 441. The other end (lower end as viewed in FIG. 5) of the output cylinder 443 is elongated so as to surround the cam body 445. The cam body 445 is prevented from coming off the clutch shaft 442 by a plurality of balls 446 and a set screw 447 in a state where the cam body 445 is rotatable relative to the clutch shaft 442. An outer peripheral surface of the cam body 445 which is surrounded by the retainer 444 is formed to have a plurality of cam hollows 445a at different circumferential positions as shown in FIG. 6. The surface of each cam hollow 445a is formed in a gentle-curved surface, and the aforementioned outer peripheral surface of the cam body 445 is shaped like fused petals in cross section taken along a plane orthogonal to the axial direction of the clutch shaft 442. A cam gear GF is integrally formed with one end (lower end as viewed in FIG. 5) of the cam body 445 and meshes with the gear GD of the lens-side AF coupler 25.

The retainer 444 is provided with a plurality of peripheral roller-accommodation openings (radial openings) 444a at equi-angular intervals in a circumferential direction, as shown in FIG. 6. A corresponding plurality of peripheral rollers 448a are installed in the plurality of peripheral roller-accommodation openings 444a and positioned between the inner peripheral surface of the output cylinder 443 and the plurality of cam hollows 445a, respectively, so that the axis of each peripheral roller 448a extends parallel to the axis of the clutch shaft 442. The retainer 444 is further provided, on the end wall thereof (upper end wall as viewed in FIG. 5) at equi-angular intervals, with a plurality of radial accommodation openings 444b (only one radial accommodation opening 444b is shown in FIG. 5). A corresponding plurality of end-face rollers 448b (only one radial end-face roller 448b is shown in FIG. 5) are installed in the plurality of radial accommodation openings 444b, respectively, so that the axis of each end-face roller 448b extends radially and so that the outer peripheral surface of each end-face roller 448b comes in contact with the end surface (upper end surface as viewed in FIG. 5) of the cam body 445 to be rotatable thereon. The clutch 44 is provided in the output cylinder 443 with a pressure disk 440 through which the clutch shaft 442 passes so that the pressure disk 440 comes in contact with one of the opposite sides of each end-face roller 448b in the axial direction of the clutch shaft 442 (upper side of each end-face roller 448b as viewed in FIG. 5), and a compression coil spring 449 is installed in the output cylinder 443 between the pressure disk 440 and an end wall (upper end wall as viewed in FIG. 5) of the housing 441 in a compressed state so that each end-face roller 448b comes in press contact with an end surface (upper end surface as viewed in FIG. 5) of the cam body 445.

In the clutch 44, a rotation of the lens-side AF coupler 25 causes the cam body 445 to rotate via the engagement of the gear GD with the gear GF when the lens-side AF coupler 25 is rotated. Upon the cam body 445 being rotated, each peripheral roller 448a is moved relative to the cam body 445 in the associated cam hollow 445a in the circumferential direction about the axis of the clutch shaft 442 which is reverse to the direction of rotation of the cam body 445 due to the friction between the peripheral roller 448a and the inner peripheral surface of the output cylinder 443. At this time, the plurality of end-face rollers 448b enables the retainer 444 to rotate relative to the cam body 445. Due to the aforementioned circumferential movement of each peripheral roller 448a relative to the cam body 445, each peripheral roller 448a firmly wedges in between the inner peripheral surface of the output cylinder 443 and the curved bottom surface of the associated cam hollow 445a, which causes the cam body 445 and the output cylinder 443 to become integral with each other circumferentially, so that the rotation of the cam body 445 is transmitted to the output cylinder 443 to rotate the rotary drive shaft 45 via the engagement of the gear GE with the gear GB. Since each cam hollow 445a of the cam body 445 is symmetric in shape with respect to a plane which extends in a radial direction of the clutch shaft 442 and in which the axis of the clutch shaft 442 lies, the rotational force of the lens-side AF coupler 25 is transmitted to the rotary drive shaft 45 in either case where the lens-side AF coupler 25 is driven in the forward or reverse directions.

On the other hand, when the rotary drive shaft 45 is rotated while the output cylinder 443 is rotated by the rotation of the rotary drive shaft 45 via the engagement of the gear GB with the gear GE, each peripheral roller 448a is moved in the reverse circumferential direction to a central portion in the associated cam hollow 445a of the cam body 445 shortly after the output cylinder 443 rotates, thus becoming freely rotatable in the associated cam hollow 445a. Consequently, the wedge engagement of each peripheral roller 448a with the inner peripheral surface of the output cylinder 443 and the curved bottom surface of the associated cam hollow 445a is released, so that the output cylinder 443 idles around the cam body 445, which prevents the rotation of the output cylinder 443 from being transmitted to the cam body 445. Therefore, only the gear GE rotates, i.e., only the output cylinder 443 rotates even if the gear GB rotates. Accordingly, the cam body 445, i.e., the gear GF does not rotate, so that the lens-side AF coupler 25 does not rotate. The lens-side AF coupler 25 does not rotate similarly also in the case where the output cylinder 443 is driven in either direction.

As shown in FIG. 3, the camera body 1 is provided therein with a main mirror (quick-return mirror) 101, an optical viewfinder 102, an imaging device 106, a shutter mechanism 107, a sub-mirror 108 and an AF unit 110. The optical viewfinder 102 is composed of a focusing screen 103, a pentagonal prism 104 and an eyepiece 105. The main mirror 101 is pivoted to be capable of rotating upward and downward and can reflect the incident light of an object image, which is passed through the interchangeable lens 2, upwards, toward the focusing screen 103 so that the object image is formed thereon to be viewed through the pentagonal prism 104 and the eyepiece 105. The imaging device 106 is provided with an image pickup device such as a CCD image sensor for capturing an object image by receiving light of an object image immediately after the main mirror 101 rotates upwards upon a shutter release. The sub-mirror reflects the incident object light downwards which is passed through a part of the main mirror 101. The AF unit 110 receives the object light reflected by the sub-mirror 108 to determine the distance to the object. Additionally, the camera body 1 is provided therein with a diaphragm drive mechanism 111 and the in-body motor 112 as an AF motor. The diaphragm drive mechanism 111 includes the diaphragm-driving slide plate 111a and engages with the drive lever 24 of the interchangeable lens 2, which projects rearwards from the rear end of the lens mount 14, to drive the diaphragm mechanism 5. The in-body motor 112 rotates the body-side AF coupler 15 on the axis thereof that is provided on the lens mount 14. The AF motor 112 is a DC motor that is driven by a direct current.

The camera body 1 is provided therein with a signal processor 113 which performs signal processing on an image signal obtained by capturing an object image by the imaging device 106 and stores the processed image signal in an image memory 114 after compressing or not compressing the processed image signal. The signal processing operation of the signal processor 113 is known in the art, and accordingly, the description of the signal processing operation will be omitted from the following descriptions. The camera body 1 is further provided therein with a CPU (controller) 100. Photometric information output from a photometering element 115 provided in the optical viewfinder 102 of the camera body 1 and AF information (distance information) output from the AF unit 110 are input to the CPU 100, and the CPU 100 calculates a correct f-number and a correct focal point based on the photometric information and the AF information. The CPU 100 controls operations of the imaging device 106, the shutter mechanism 107. Furthermore the CPU 100 is configured to be capable of controlling the operation of the diaphragm drive mechanism 5 based on photographic information input from the photometering element 115, the operation of the in-body motor 112 based on AF information input from the AF unit 110, and the operation of the AF mechanism 4 in the interchangeable lens 2.

In a state where the interchangeable lens 2 is mounted to the camera body 1, the array of information/power supply contact pins 16 of the camera body 1 are in contact with the array of information/power contact pins 26 of the interchangeable lens 2, respectively, so that various information can be exchanged between the camera body 1 and the interchangeable lens 2 while power can be supplied from the camera body 1 to the interchangeable lens 2. Moreover, the lens-side AF coupler 25 and the body-side AF coupler 15 are coupled to each other to be integral with each other in the rotational direction. Furthermore, the diaphragm-driving slide plate 111a of the diaphragm drive mechanism 111 engages with the diaphragm drive lever 24 of the interchangeable lens 2, which enables the diaphragm mechanism 5 to operate by a movement of the diaphragm-driving slide plate 111a.

Photographing operations of the present embodiment of the camera system that has the above described structure will be hereinafter discussed with reference to the flow chart shown in FIG. 7. In the present embodiment of the camera system, the camera body 1 is configured to perform an AF operation using the in-lens ultrasonic motor 43 by either a setting determined using the mode select dial 13, or a setting automatically determined in the camera body 1 upon inputting information from the interchangeable lens 2 that the interchangeable lens 2 mounted to the camera body 2 incorporates an in-lens motor, when the interchangeable lens 2 is mounted to the camera body 2.

In a state where this setting has been made, the CPU 100 determines whether or not the release button 11 has been depressed half way (step S101). If the CPU 100 determines that the release button 11 has been depressed half way (if YES at step S101), a photometering operation and a colorimetering operation are performed with the photometering element 115 (step S102), and the CPU 100 calculates a correct f-number from photometric data and colorimetric data obtained by the photometering operation and the colorimetering operation, respectively. Upon completion of this calculation, the CPU 100 outputs f-number information to the diaphragm drive mechanism 111 to set an estimated moving amount of the diaphragm-driving slide plate 111a.

Simultaneously with this setting operation, the AF unit 110 performs a distance measuring operation, and the CPU 100 performs a distance calculating operation based on distance measurement data obtained by the distance measuring operation (step S103). Upon completion of the distance calculating operation, the CPU 100 outputs the distance information obtained by this distance calculating operation as AF information firstly to the in-body motor 112 in the camera body 1 to drive the in-body motor 112 (step S104). Thereafter, the CPU 100 resets a counter value N of a built-in counter of the CPU 100 to zero (step S105), and subsequently, the CPU 100 outputs the AF information to the in-lens ultrasonic motor 43 in the interchangeable lens 2 to drive the in-lens ultrasonic motor 43 (step S106).

Thereafter, the CPU 100 determines whether or not the counter value N of the built-in counter is 0 (step S107). If the counter value N is 0 (if YES at step S107), the counter value N is incremented by one (N=N+1) (step S108), and thereupon the rotation of the in-body motor 112 is stopped in an extremely short period of time (step S109). On the other hand, the CPU 100 continuously compares the rotational position (angle of rotation) of the in-lens ultrasonic motor 43 with the AF information while continuously driving the in-lens ultrasonic motor 43, and the CPU 100 stops driving the in-lens ultrasonic motor 43 (step S111) upon determining that the rotational position of the in-lens ultrasonic motor 43 matches with the AF information, i.e., that the in-lens ultrasonic motor 43 has rotated to a rotational position thereof which corresponds to an in-focus position (step S110). If the CPU 100 determines at step S110 that the in-lens ultrasonic motor 43 has not rotated to a rotational position thereof which corresponds to an in-focus position, control returns to step S106, so that the CPU 100 continues to drive the in-lens ultrasonic motor 43. At this time, control skips the operations at steps S108 and 109 since the counter value N is not 0.

Subsequently, the CPU 100 determines whether or not the release button 11 has been depressed half way (step S112). If the CPU 100 determines that the release button 11 has been depressed half way (if YES at step S112), it is determined whether or not the release button 11 has been fully depressed (step S113). If it is determined at step S113 that the release button 11 has been fully depressed, the diaphragm drive mechanism 111 moves the diaphragm-driving slide plate 111*a* by a preset amount of movement to drive the diaphragm drive lever 24 that is engaged with the diaphragm-driving slide plate 111*a* to thereby set the interchangeable lens 2 at the aforementioned calculated correct f-number. Simultaneously, the shutter mechanism 107 is actuated while an image capturing operation is performed to capture an image (image signal) via the imaging device 106 (step S114). The image signal thus captured is stored in the image memory 114 after being processed by the signal processor 113 (step S115), and thereafter control ends.

Figure 7:
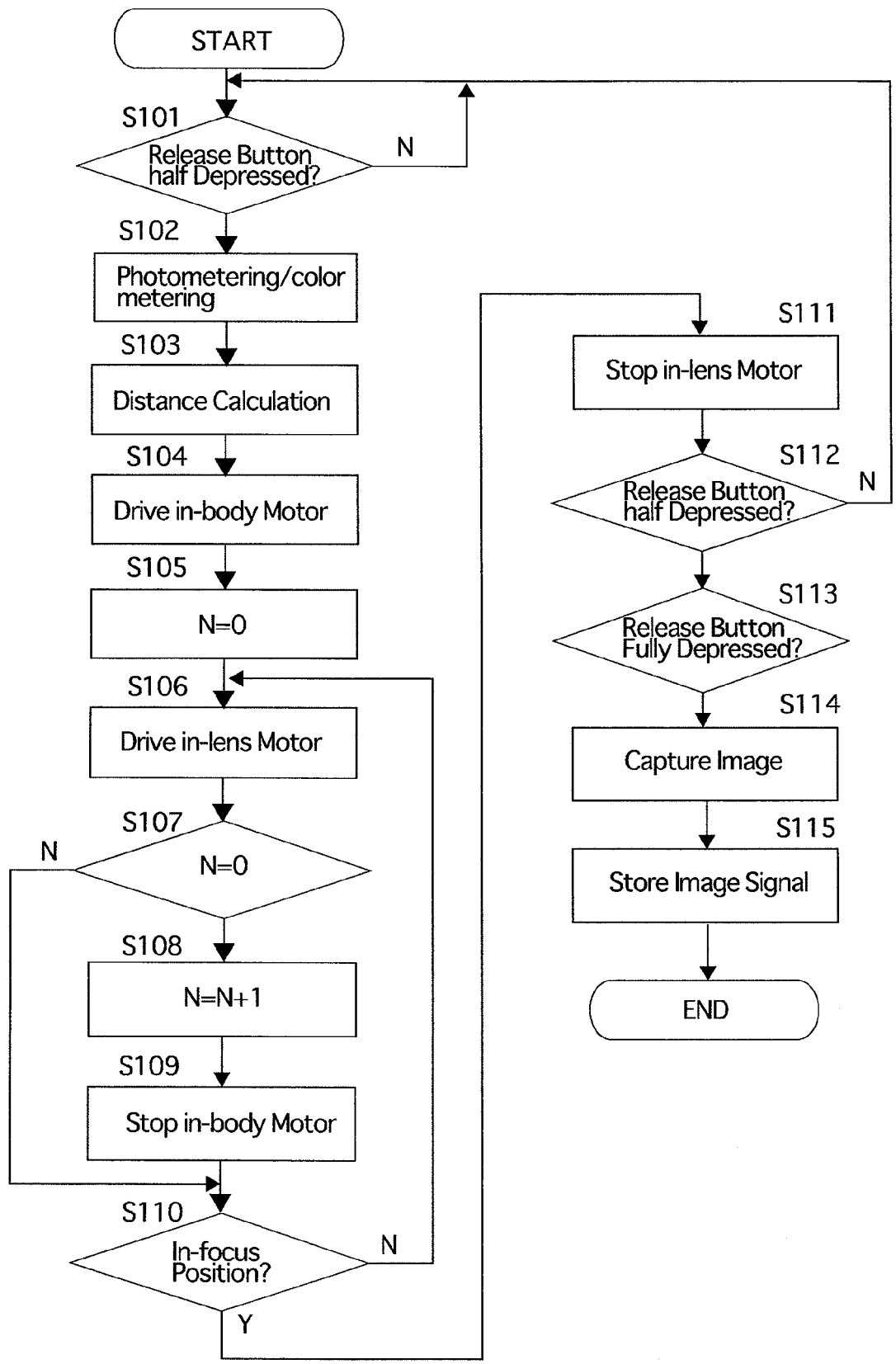
FIG. 7 is a flow chart showing a sequence of operations for capturing and storing an object image which is performed in the embodiment of the camera system.

In the flow chart shown in FIG. 7, firstly the in-body motor 112 is driven based on AF information at step S104. Upon the in-body motor 112 being driven, rotation of the in-body motor 112 causes the body-side AF coupler 15 to rotate on the axis thereof, thus causing the lens-side AF coupler 25 to rotate with the body-side AF coupler 15 that is coupled to the lens-side AF coupler 25. This rotation of the lens-side AF coupler 25 causes the cam body 445 to rotate due to the engagement between the gears GD and GF. This rotation of the cam body 445 causes the clutch 44 to enter the ON state, thus causing the output cylinder 443 to rotate, so that the rotary drive shaft 45 rotates via the engagement between the gears GE and GB. This rotation of the rotary drive shaft 45 causes the gear GC to rotate, and this rotation of the gear GC causes the focus-ring gear ring 41 that is in mesh with the gear GC to rotate. This rotation of the focus-ring gear ring 41 causes the focusing lens group FL to move in the optical axis direction via the focusing mechanism 3 to thereby start a focusing operation. Simultaneously with the start of the focusing operation, the rotation of the gear GB causes the gear GA that is in mesh with the gear GB to rotate, and accordingly, the rotor 436 of the in-lens ultrasonic motor 43 is forced to rotate. Therefore, even if the press-contact surfaces of the rotor 436 and the stator 431 stick (adhere) to each other by an interfacial force produced therebetween, the rotational force exerted on the rotor 436 releases such sticking, which allows the in-lens ultrasonic motor 43 to start rotating without delay.

Immediately after AF information output from the CPU 100 is input to the in-lens ultrasonic motor 43 via the array of information/power supply contact pins 16 and the array of information/power contact pins 26, the in-lens ultrasonic motor 43 starts rotating by supplied electric power, and the rotation of the in-lens ultrasonic motor 43 is controlled so that the in-lens ultrasonic motor 43 rotates until a rotational position thereof which corresponds to the AF information. This rotation control is a so-called feedback control. Although the details of the feedback control will be omitted from the following descriptions, in this rotation control the amount of rotation of the focus-ring gear ring 41 that is correlated to the position of the focusing lens group FL in the optical axis direction is detected and the operation of the in-lens ultrasonic motor 43 is controlled so that this detected amount of rotation of the focus-ring gear ring 41 and the AF information correspond to each other. When the in-lens ultrasonic motor 43 starts rotating, the in-lens ultrasonic motor 43 can start rotating with reliability and with an excellent start-up performance because the in-lens ultrasonic motor 43 has already started rotating by a mechanical rotational force from the rotary drive shaft 45 to thereby release the aforementioned sticking between the press-contact surfaces of the rotor 436 and the stator 431 if such sticking has occurred.

After the commencement of rotation of the in-lens ultrasonic motor 43, the in-body motor 112 has stopped rotating at step S106, and accordingly, the rotational force of the in-body motor 112 via the body-side AF coupler 15 and the lens-side AF coupler 25 is not exerted on the in-lens ultrasonic motor 43 via the clutch 44, so that normal rotation of the in-lens ultrasonic motor 43 is maintained. The time from the moment at which the in-lens ultrasonic motor 43 starts rotating at step S106 to the moment at which the in-body motor 112 stops rotating at step S109 is preset to at least 10 ms. Although the rotational force of the in-body motor 112 remains exerted on the in-lens ultrasonic motor 43 via the clutch 44 during the time until the in-body motor 112 stops rotating, during this time the rotational speed of the gear GB via rotation of the in-body motor 112 is controlled so as to be slower than the rotational speed of the gear GB via rotation of the in-lens ultrasonic motor 43 so that the difference between these two rotational speeds of the gear GB is absorbed by the rotation-force disconnecting function of the clutch 44, i.e., by the difference in number of revolutions between the cam body 445 and the output cylinder 443. Consequently, no load in the rotational direction reverse to the rotational direction of the in-lens ultrasonic motor 43 is applied to the in-lens ultrasonic motor 43. After the in-body motor 112 stops rotating at step S109, the rotary drive shaft 45 rotates by the in-lens ultrasonic motor 43, and this rotation of the rotary drive shaft 45 causes the focus-ring gear ring 41 to rotate so that a focusing operation continues to be performed. Subsequently, the in-lens ultrasonic motor 43 stops rotating at step S111 upon completion of the focusing operation (upon focus being achieved).

In the case where an AF operation is performed in the interchangeable lens 2 using the in-body motor 112 via the setting in the camera body 1, the CPU 100 drives only the in-body motor 112 based on AF information. Forward and reverse rotations of the in-body motor 112 are transmitted from the body-side AF coupler 15 to the lens-side AF coupler 25 to rotate the gear GB and the rotary drive shaft 45 via the clutch 44, and this rotation of the rotary drive shaft 45 causes the gear GC to rotate, thus causing the focus-ring gear ring 41 to rotate, which drives the focusing mechanism 3 to perform an AF operation. During this AF operation, the rotor 436 freely idles though the in-lens ultrasonic motor 43 is rotated by rotation of the gear GA that is in mesh with the gear GB because no AF information is input to the in-lens ultrasonic motor 43 and no vibrations occur at the stator 431; consequently, such idling of the rotor 436 does not become an obstacle to the AF operation performed using the in-body motor 112.

Additionally, in the present embodiment of the camera system, control returns to step S101 from step S112 if the release button 11 has not remained depressed half way since it is determined at step S112 whether or not the release button 11 has remained depressed half way. In practice, it is sometimes the case that the release button 11 which is depressed half way is released after the completion of focus achievement at step S110 so that the image capturing operation is not performed at step S114. In this case, every time the release button 11 is depressed half way, the in-body motor 112 is driven to rotate for an extremely short period of time to force the in-lens ultrasonic motor 43 to rotate, which releases any sticking between the press-contact surfaces of the rotor 436 and the stator 431 which may occur in the in-lens ultrasonic motor 43.

In the interchangeable lens 2 of the present embodiment of the camera system, manually rotating the focus ring 22 causes the focus-ring gear ring 41 that is integral with the focus ring 22 to rotate, so that the focusing lens group FL can be moved in the optical axis direction to perform a focusing operation by manually rotating the focus ring 22. When the focus ring 22 is manually rotated, the lens-side AF coupler 25 is not rotated and is disconnected from the in-body motor 112 because of the rotation-force disconnecting function of the clutch 44, and accordingly, the manual focusing operation is possible. At this time, the rotor 436 idles freely in the in-lens ultrasonic motor 43 even though the in-lens ultrasonic motor 43 rotates with the focus-ring gear ring 41; in this regard also, such idling of the rotor 436 does not become obstacle to the manual operation of the focus ring 22.

The in-body motor that is provided in the camera body of the camera system according to the present invention is not limited to a DC motor as long as the in-body motor is of a type which can be started rotating without delay upon an electric current being passed through the motor. For instance, a stepping motor or the like can be adopted as the in-body motor. In addition, the focus-ring gear ring of the interchangeable lens does not necessarily need to be configured to be manually operated by an operation of a focus ring.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera system comprising:
   a camera body having an in-body motor;
   an interchangeable lens having an in-lens motor, said interchangeable lens being detachable from said camera body;
   a focusing mechanism for moving a focusing lens group provided in said interchangeable lens in an optical axis direction thereof;
   a rotational force transmission device which transmits a rotational force of said in-body motor to said focusing mechanism to perform an AF operation in a state where said interchangeable lens is attached to said camera body;
   an auto-focusing mechanism for driving said focusing mechanism to perform an AF operation by said in-lens motor, independently from said in-body motor; and
   a one-way clutch which allows transmission of a rotational force of said in-body motor to said in-lens motor while preventing a rotational force of said in-lens motor from being transmitted to said in-body motor.

2. The camera system according to claim 1, wherein said in-lens motor comprises an ultrasonic motor.

3. The camera system according to claim 1, wherein said rotational force transmission device comprises:
   a lens-side AF coupler provided on said interchangeable lens; and
   a body-side AF coupler provided on said camera body; wherein
   said lens-side AF coupler is coupled with said body-side AF coupler when said interchangeable lens is attached to said camera body, said body-side AF coupler outputting said rotational force of said in-body motor.

4. The camera system according to claim 3, wherein said in-lens motor is constantly engaged with said focusing mechanism, and
   wherein said one-way clutch is provided between said lens-side AF coupler and said focusing mechanism.

5. The camera system according to claim 1, further comprising a focus ring which is manually operated in a manual focusing operation,
   wherein said focusing mechanism comprises a focus-ring gear ring which moves said focusing lens group in said optical axis direction when rotated, and
   wherein said focus-ring gear ring is engaged with said focus ring to rotate with said focus ring when said focus ring is manually rotated.

6. The camera system according to claim 1, wherein said one-way clutch comprises:
   a cam body shaped like fused petals in cross section; and
   a plurality of cylindrical rollers arranged around said cam body to move thereon.

7. The camera system according to claim 5, wherein said focus ring and said focus-ring gear ring are coaxially arranged.

8. The camera system according to claim 1,
   wherein said in-body motor comprises a DC motor, and
   wherein said camera body comprises a controller which drives said DC motor before driving said in-lens motor upon start-up of said AF operation.

9. The camera system according to claim 8, wherein said controller controls said in-lens motor so as to start rotating during operation of said in-body motor, and
   wherein said controller controls said in-body motor so as to stop rotating after commencement of rotation of said in-lens motor.

10. The camera system according to claim 9, wherein said in-body motor and said in-lens motor rotate simultaneously for at least 10 ms from a moment at which said in-lens motor starts rotating to a moment at which said in-body motor stops rotating.

11. The camera system according to claim 9, wherein a rotational speed of said focusing mechanism that is driven by said in-body motor is slower than a rotational speed of said focusing mechanism that is driven by said in-lens motor when said in-body motor and said in-lens motor rotate simultaneously.

12. An interchangeable lens which is detachable from a camera body, said camera body having an in-body motor, said interchangeable lens comprising:
   a focusing mechanism for moving a focusing lens group in an optical axis direction thereof;
   a rotational force transmission device which transmits a rotational force of said in-body motor to said focusing mechanism to perform an AF operation in a state where said interchangeable lens is attached to said camera body;
   an in-lens motor;
   an auto-focusing mechanism for driving said focusing mechanism to perform an AF operation by said in-lens motor, independently from said in-body motor; and
   a one-way clutch which allows transmission of a rotational force of said in-body motor to said in-lens motor while preventing a rotational force of said in-lens motor from being transmitted to said in-body motor.

* * * * *